United States Patent [19]

Bardhan et al.

[11] Patent Number: 5,004,713
[45] Date of Patent: Apr. 2, 1991

[54] FREQUENCY STABLE NPO CERAMICS

[75] Inventors: Pronob Bardhan, Corning; Chyang J. Yu, Painted Post, both of N.Y.

[73] Assignee: Corning Incorporated, Corning, N.Y.

[21] Appl. No.: 375,701

[22] Filed: Jul. 5, 1989

[51] Int. Cl.$^5$ ............................................. C04B 35/46
[52] U.S. Cl. .................... 501/134; 501/135; 501/136
[58] Field of Search .................. 501/134, 135, 136

[56] References Cited

U.S. PATENT DOCUMENTS

| | | | |
|---|---|---|---|
| 3,847,829 | 11/1974 | Bouchard | 501/126 |
| 4,054,531 | 10/1977 | Takahashi et al. | 501/134 |
| 4,073,846 | 2/1978 | Masumura et al. | 501/134 |

FOREIGN PATENT DOCUMENTS

| | | | |
|---|---|---|---|
| 49-038196 | 4/1974 | Japan | 501/134 |
| 54-018392 | 7/1979 | Japan | 501/134 |
| 56-045866 | 4/1981 | Japan | 501/134 |
| 60-233801 | 11/1985 | Japan | 501/134 |
| 460271 | 2/1975 | U.S.S.R. | 501/134 |

*Primary Examiner*—Mark L. Bell
*Assistant Examiner*—Anthony J. Green
*Attorney, Agent, or Firm*—Clinton S. Janes, Jr.

[57] ABSTRACT

Bismuth-containing temperature-stable dielectric ceramics are disclosed herein that are stable over a wide range of frequencies, and thus are suitable for ceramic capacitors and microwave dielectrics. This class of materials is defined by the formula $Bi_2O_3\ xTiO_2$ wherein x ranges up to 7 and the $Ti^{4+}$ ion may be replaced with mixed ions of equivalent charge, thus maintaining charge balance. Suitable replacements for the $Ti^{4+}$ ion are: $A_{1/3}^{2+}B_{2/3}^{5+}$, $R_{2/3}^{3+}C_{1/3}^{6+}$, $A_{1/2}^{2+}C_{1/2}^{6+}$, $R_{1/2}^{3+}B_{1/2}^{5+}$, $M_{1/4}^{1+}B_{3/4}^{5+}$, and $M_{2/5}^{1+}C_{3/5}^{6+}$; where $M^+$ is selected from the group consisting of $Li^+$, $Na^+$, $K^+$, $Cu^+$, and $Ag^+$; $A^{2+}$ is selected from the group consisting of $Mg^{2+}$, $Zn^{2+}$, $Ni^{2+}$, $Co^{2+}$, $Cu^{2+}$, and $Cd^{2+}$; $R^{3+}$ is selected from the group consisting of $Cr^{3+}$, $Mn^{3+}$, $Fe^{3+}$, $Al^{3+}$, $Ga^{3+}$, $Zn^{3+}$, $Tl^{3+}$, $Sb^{3+}$, $As^{3+}$, $Y^{3+}$, $Lu^{3+}$, $Yb^{3+}$, $Tm^{3+}$, $Er^{3+}$, $Ho^{3+}$, $Dy^{3+}$, $Tb^{3+}$, $Gd^{3+}$, $Eu^{3+}$, and $Sm^{3+}$; $B^{5+}$ is selected from the group consisting of $Nb^{5+}$, $Ta^{5+}$, and $V^{5+}$; and $C^{6+}$ is selected from the group consisting of $W^{6+}$ and $Mo^{6+}$.

13 Claims, 7 Drawing Sheets

FREQUENCY STABLE NPO CERAMICS

BACKGROUND OF THE INVENTION

This invention relates to bismuth-containing temperature-stable dielectric ceramics that are stable over a wide range of frequency, and thus suitable for NPO and microwave applications.

Some dielectric materials exhibit very stable dielectric properties from low frequency through the microwave frequency range. The basis of this class of frequency-stable compositions is the temperature compensating NPO materials described in U.S. application Ser. No. 318,698, filed Mar. 3, 1989 by Bardhan et al under the title CAPACITORS AND HIGH DIELECTRIC CONSTANT CERAMICS THEREFOR, wherein a material with a high dielectric constant, a low dissipation factor, and a small temperature coefficient of capacitance is described.

Though the vast majority of NPO materials is evaluated at a single frequency based upon the capacitance of the material, the effects of varying frequency with respect to each of the said factors are known to the art. In conventional ceramics, the dissipation factor is known to increase with increasing frequency, whereas the dielectric constant is known to decrease with increasing frequency.

Temperature-stable dielectric ceramics that remain stable over a wide frequency range are useful low K NPO ceramic capacitors that maintain low impedance in the integrated circuitry of high speed computers, microwave dielectrics for capacitors or resonators, and substrate materials for microwave circuits. Unlike the temperature compensating materials described in U.S. application Ser. No. 318,698, these materials are also evaluated in terms of the dielectric Q factor, the reciprocal of the dissipation factor, and the temperature coefficient of resonance frequency, $\tau_f$. The temperature coefficient of resonant frequency is defined by the equation $$\tau_f - [\tau_\epsilon/(2+\alpha)]$$

where $\tau_\epsilon$ is the temperature coefficient of the dielectric constant and $\alpha$ is the linear thermal expansion coefficient. The physical constant, $\tau_\epsilon$, relates to the measurable parameter, TCC, the temperature coefficient of capacitance via the equation $$\tau_\epsilon = TCC - \alpha$$

High Q factors and frequency stability are required for small TCC's, though a small TCC does not necessarily imply a high Q factor or frequency stability.

Perhaps the most common use of this class of frequency stable NPO materials having a high dielectric constant and a high Q factor at microwave frequency is that of dielectric resonators, devices that act as filters and stabilizers of oscillations in microwave circuits. In the 1960's titania was most often used as a dielectric resonator, exhibiting a dielectric constant of 100 and a Q factor of 10000 at microwave frequency. However, the temperature coefficient of resonance frequency, $\sim +400$ ppm/°C., was too high for practical applications. Since then, a number of titaniabased, temperature-stable ceramics with high dielectric constants have been explored with relative successes, among which are the $BaO\text{-}TiO_2$, $ZrO_2\text{-}SnO_2\text{-}TiO_2$, and $MgO\text{-}TiO_2$ systems, as can be readily seen in U.S. Pat. Nos. 4,753,906 and 4,665,041 discussed later in the prior art. More recently, these and a host of other materials have been adapted to such uses as automobile telephones and receivers for satellite broadcasting.

Dielectric resonators are often used in receivers for satellite broadcasting or SHF broadcasting on the ground. When a dielectric resonator is used at the high frequency bands common to broadcasting, such as 0.5–6 GHz, several shortcomings may occur: (1) since their specific dielectric constants are small, it has been impossible to sufficiently miniaturize the resonator; (2) the Q factor may become small (the dielectric loss becomes large); and (3) the nonlinearity of the change in resonance frequency accompanying changes in temperature makes it difficult to compensate for the temperature characteristics. Conversely, the desired properties of such dielectric materials are a dielectric constant large enough to satisfy the requirement of reduction in size, small dielectric losses at high frequencies, and the change of the resonance frequency with respect to temperature, i.e., the temperature dependence of the dielectric constant, should be small. In general, desired dielectric properties of dielectric properties targeted for resonators are: a high relative dielectric constant (30–40); a high Q factor (>3000 at 10 GHz); and a low temperature coefficient of resonant frequency ($0 \pm 10$ ppm/°C.). More specific and stringent standards may be required, however, as indicated in European Patent 0,095,338, which discloses the need to improve the performance of the receiver by improving the dielectric properties of the materials used in producing the dielectric resonator; namely, a dielectric constant of 25 to 40, an unloaded Q factor of $10^4$ or more and a temperature coefficient of resonant frequency of within $\pm 10$ ppm/°C. in a 10 GHz band and at about room temperature.

It is therefore an object of this invention to provide novel temperature-stable compositions for use in the development of, but not limited to, frequency stable ceramic capacitors.

It is another object of this invention to provide an NPO ceramic material with a dielectric constant that is stable from low frequency through the microwave frequency range.

It is yet another object of this invention to provide an NPO ceramic suitable for producing dielectric resonators.

SUMMARY OF THE INVENTION

The embodiment of the present invention is the compositions defined by the formula;

$$Bi_2O_3 \; xTiO_2$$

wherein x ranges up to 7 and the $Ti^{4+}$ ion may be replaced with mixed ions of equivalent charge, thus maintaining charge balance.

Suitable replacements for the $Ti^{4+}$ ion are:

$A_\frac{1}{2}^{2+} B_\frac{1}{2}^{5+}$,

$R_\frac{1}{2}^{3+} C_\frac{1}{2}^{6+}$, $A_\frac{1}{2}^{2+} C_\frac{1}{2}^{6+}$, $R_\frac{1}{2}^{3+} B_\frac{1}{2}^{5+}$, $M_\frac{1}{2}^{1+} B_\frac{1}{2}^{5+}$, $M_{2/5}^{1+} C_{3/5}^{6+}$, where M+ is selected from the group consisting of:

Li+, Na+, K+, Cu+, and Ag+;

A²+ is selected from the group consisting of:

Mg²+, Zn²+, Ni²+, Co²+, Cu²+, and Cd²+;

R³+ is selected from the group consisting of:
Cr³+, Mn³+, Fe³+, Al³+, Ga³+, Zn³+, Tl³+, Sb³+, As³+, Y³+, Lu³+, Yb³+, Tm³+, Er³+, Ho³+, Dy³+, Tb³+, Gd³+, Eu³+, and Sm³+;

B⁵+ is selected from the group consisting of:

Nb⁵+, Ta⁵+, and V⁵+;

and C⁶+ is selected from the group consisting of:

W⁶+ and Mo⁶+.

PRIOR ART

A host of high frequency and frequency-stable dielectric compositions have been explored and are documented in the art. For example:

U.S. Pat. No. 4,339,543 discloses a dielectric material having a high dielectric constant, very low high frequency losses, and very high temperature stability that is comprised of 0.9–1.1 moles of $TiO_2$, 0.1–0.4 moles of $SnO_2$, 0.015–0.06 moles of NiO, 0.6–0.9 moles of $ZrO_2$, 0.01–0.1 moles of $La_2O_3$, and 0.0035 moles of Fe with respect to each mole of $TiO_2$. Unlike the compositions in the present invention, bismuth is not a constituent of this composition.

U.S. Pat. No. 4,338,403 describes a dielectric ceramic consisting essentially of 88 wt. % of a main component that is comprised of 34.5–82.0 wt. % $TiO_2$, 9.0–63.0 wt. % $Pr_6O_{11}$, and 2.5–23.5 wt. % BaO, and up to 12 wt. % $SnO_2$. Up to 95 wt. % of the $Pr_6O_{11}$ contained in the main component may be replaced with $Nd_2O_3$. Unlike the compositions in the present invention, bismuth is not a constituent of this composition.

European Patent 0,095,338 discloses a low loss microwave dielectric material comprising a sinter of a mixture of a perovskite-type structure compound oxide comprising solely or mainly $Ba(Zn_{\frac{1}{3}}Ta_{\frac{2}{3}})O_3$ and $Ba(Mg_{\frac{1}{3}}Ta_{\frac{2}{3}})O_3$ with a small amount of Mn. The Mn addition not only favorably affects sinterability to lower the required sintering temperature, but also advantageously heightens the unloaded Q factor of the resulting sinter in an SHF band. Unlike the compositions in the present invention, bismuth is not a constituent of this composition.

U.S. Pat. No. 4,665,041 discloses a dielectric ceramic composition for high frequencies that comprises a main component of a $TiO_2$-$ZrO_2$-$SnO_2$ system and contains, as additives, not more than 7 wt. % ZnO, not more than 10 wt. % NiO, and not more than 7 wt. % of a metal oxide. Unlike the compositions in the present invention, bismuth is not a constituent of this composition.

U.S. Pat. No. 4,670,409 discloses a dielectric ceramic material comprising lanthanum-magnesium-titanate having a small dielectric loss, a large dielectric constant, and a temperature coefficient of resonance frequency that can be controlled to a small value within a certain range, said dielectric material being valuable as a microwave resonator. Unlike the compositions in the present invention, bismuth is not a constituent of this composition.

U.S. Pat. No. 4,717,694 describes a dielectric ceramic composition for high frequencies that consists essentially of $Ba(Zr_xZn_yNi_zTa_uNb_v)O_{\frac{1}{2}(7-x-3y-3z)}$ wherein x, y, z, u, and v are mo of respective components. Unlike the compositions in the present invention, bismuth is not a constituent of this composition.

U.S. Pat. No. 4,745,093 details a dielectric ceramic material having a chemical composition represented by the formula $Sr(Ni_{\frac{1}{3}}Nb_{\frac{2}{3}})O_3$ or $(1-x)Sr(Ni_{\frac{1}{3}}Nb_{\frac{2}{3}})O_3$-$xBaTiO_3$ in which x is a positive number of up to 0.3 and also having a small dielectric loss, a large dielectric constant, and a temperature coefficient of resonance frequency that can be controlled within a certain range. Said properties make this material valuable for use in microwave dielectric ceramics. Unlike the compositions in the present invention, bismuth is not a constituent of this composition.

U.S. Pat. No. 4,749,669 describes a dielectric ceramic composition comprising a ternary system composition represented by the formula $aBaO$-$bTiO_2$-$cWO_3$ (wherein a, b, and c are per cent molar fractions totalling 100, i.e., $a+b+c=100$) and characterized by a high dielectric constant, large Q, and a small $\tau_f$, thus making said dielectric ceramic especially, but not exclusively, useful in microwave applications. Unlike the compositions in the present invention, bismuth is not a constituent of this composition.

U.S. Pat. No. 4,753,906 details a dielectric ceramic composition for microwave applications having the formula $$\frac{a}{100} [(100 - n)BaO \times (n)MO] - bTiO_2 - cR_2O_3$$

wherein a, b, and c are molar percentages totalling 100, M is at least one element selected from the group consisting of Sr, Ca, and Mg, and R is at least one element selected from the group consisting of Nd, Sm, and La. Unlike the compositions in the present invention, bismuth is not a constituent of this composition.

U.S. Pat. No. 4,775,649 describes a dielectric porcelain composition expressed by the formula $Ba_xSr_uCa_z(Zn_{\frac{1}{3}}Nb_{\frac{2}{3}})_{1-t}Ti_tO_3$ in which $x+y+z=1$, said material being suitable for producing a dielectric resonator to be advantageously used in 0.5–6 GHz band and having a large unloaded Q value, and adequate relative dielectric constant, a stable $\tau_f$, and superior linearity of temperature characteristics of the resonance frequency. Unlike the compositions in the present invention, bismuth is not a constituent of this composition.

U.S. Pat. No. 4,792,537 details a dielectric ceramic composition for high frequencies consisting essentially of a basic composition expressed by the general formula $xMgO$-$yAl_2O_3$-$zSiO_2$ wherein $x+y+z=100$ and 0.1–10 wt. % of invention, bismuth is not a constituent of this composition.

European Patent 0,211,371 discloses a dielectric porcelain used as a dielectric resonator mainly in the microwave range that consists essentially of 0.1–5.3 mol % of one or more of $Tb_4O_7$, $CeO_2$, $TeO_2$, $Gd_2O_3$, and D as an additive admixed with a dielectric material $Pb_xZr_{1-x}O_{2-x}$, wherein $0.42 \leq x \leq 0.69$. Unlike the compositions in the present invention, bismuth is not a constituent of this composition.

European Patent 0,273,305 describes a dielectric ceramic consisting essentially of a BaO-TiO$_2$-WO$_3$ ternary system having a high Q, a small dielectric constant, and a sufficiently small coefficient of resonant frequency, $\tau_f$, making it particularly useful in the microwave region. Unlike the compositions in the present invention, bismuth is not a constituent of this composition.

European Patent 0,295,133 details a dielectric ceramic consisting essentially of about 35–55 mol % ZrO$_2$, 30–50 mol % TiO$_2$, 5 to about 22.5 mol % SnO$_2$, about 0.5–10 mol % ZnO$_2$, and 0.3 to about 2.5 mol % CuO, having a dielectric constant greater than 35, a quality factor, Q, greater than 9000 at 4 GHz, and a reduction of the firing temperature to less than about 1350° C. Unlike the compositions in the present invention, bismuth is not a constituent of this composition.

DESCRIPTION OF PREFERRED EMBODIMENTS

The preferred embodiment of this invention is the ion-substituted compositions defined by the aforementioned formula where $4 > x > 5$. A host of compositions may be introduced; for example, when x is equal to 4 the compositions Bi$_6$A$_4$B$_8$O$_{33}$, Bi$_6$R$_8$C$_4$O$_{33}$, Bi$_2$A$_2$C$_2$O$_{11}$, Bi$_2$R$_2$B$_2$O$_{11}$, Bi$_2$MB$_3$O$_{11}$, and Bi$_{10}$M$_8$C$_{12}$O$_{55}$ may be formulated and when x is equal to 4.5 the compositions Bi$_4$AB$_6$O$_{24}$, Bi$_4$R$_6$C$_3$O$_{24}$, Bi$_8$A$_9$C$_9$O$_{48}$, Bi$_8$R$_9$B$_9$O$_{48}$, Bi$_{16}$M$_9$B$_{27}$O$_{96}$, and Bi$_{20}$M$_{18}$C$_{27}$O$_{120}$ may be formulated.

Example I

Frequency stable dielectrics were prepared by utilizing a solid state reaction; viz., homogeneous mixtures of the starting oxides and carbonate powders were prepared by (vibro)milling for 16 hours, drying and then calcining. Five batches were synthesized with raw materials of reagent grade Bi$_2$O$_3$, MgO, and Nb$_2$O$_5$, and their respective weights calculated according to the formula Bi$_2$O$_3$-x(Mg$_\frac{1}{3}$Nb$_\frac{2}{3}$)O$_2$, where X=1, 2, 3, 4, and 4.5, respectively. The materials were milled in a polypropylene bottle with $\frac{3}{8}$ inch zirconia balls as the grinding media. Isopropyl alcohol (IPA) was poured into the bottle until approximately 98% of the volume was filled and the contents of each bottle milled for 16 hours. Next the resulting slurry was transferred to a PYREX® bowl, covered loosely with aluminum foil to avoid contamination, and placed in an oven at 80° C. to evaporate excess IPA. Calcination followed and was carried out in air in accordance with the following schedule;

| (1) room temperature - 580° C. | 5.6 hours |
| (2) 580° C. hold | 2 hours |
| (3) 580° C. - 750° C. | full furnace power |
| (4) 750° C. hold | 4 hours |
| (5) 750° C. - room temperature | 7.3 hours |

After calcination, the powder was mixed with a carbowax binder solution, vibromilled for 16 hours, dried in an oven at 80° C., and granulated by hand. The powder was then scalped through a 20 mesh sieve to reduce agglomerate size and pressed into pellets; first mechanically at 10 ksi and then isostatically at 27 ksi. The pellets were then sintered on zirconia setter plates at temperatures between 900° C. and 1250° C. for 2 hours, the appropriate sintering temperature for each batch being chosen according to the post-firing density.

The fired pellets were electroded by evaporating gold onto both surfaces of the samples. The room temperature dielectric constants ($\epsilon_r$) and the Q factors (with a sensitivity limit of 10$^4$) of the samples were measured under weak AC fields at frequencies of 1, 3.16, 10, 31.6, 100, 316, and 1000 kHz using a Hewlett Packard 4192A LF Impedance Analyzer, and at frequencies of 3, 5, 10, 20, and 40 MHz using a Hewlett Packard 4191A RF Impedance Analyzer. The relative dielectric constants ($\epsilon_r$) were calculated by assuming the dimensions of the samples throughout the temperature range to be the same as those at room temperature, and by assuming that no adjustments were needed to accommodate changes due to changes in temperature. The automatic dielectric measurement station (with Hewlett Packard 4192A Analyzer) was used for measuring the temperature dependence of the dielectric constant and the Q factor at temperatures between −55° C. and 145° C., and at various frequencies between 1 kHz and 3.6 MHz.

The thermal expansion coefficient was measured with a dilatometer in the temperature range from ambient temperature to 500° C. and the data taken between 25° C. and 125° C. were used in estimating $\tau_f$.

Figure 1:
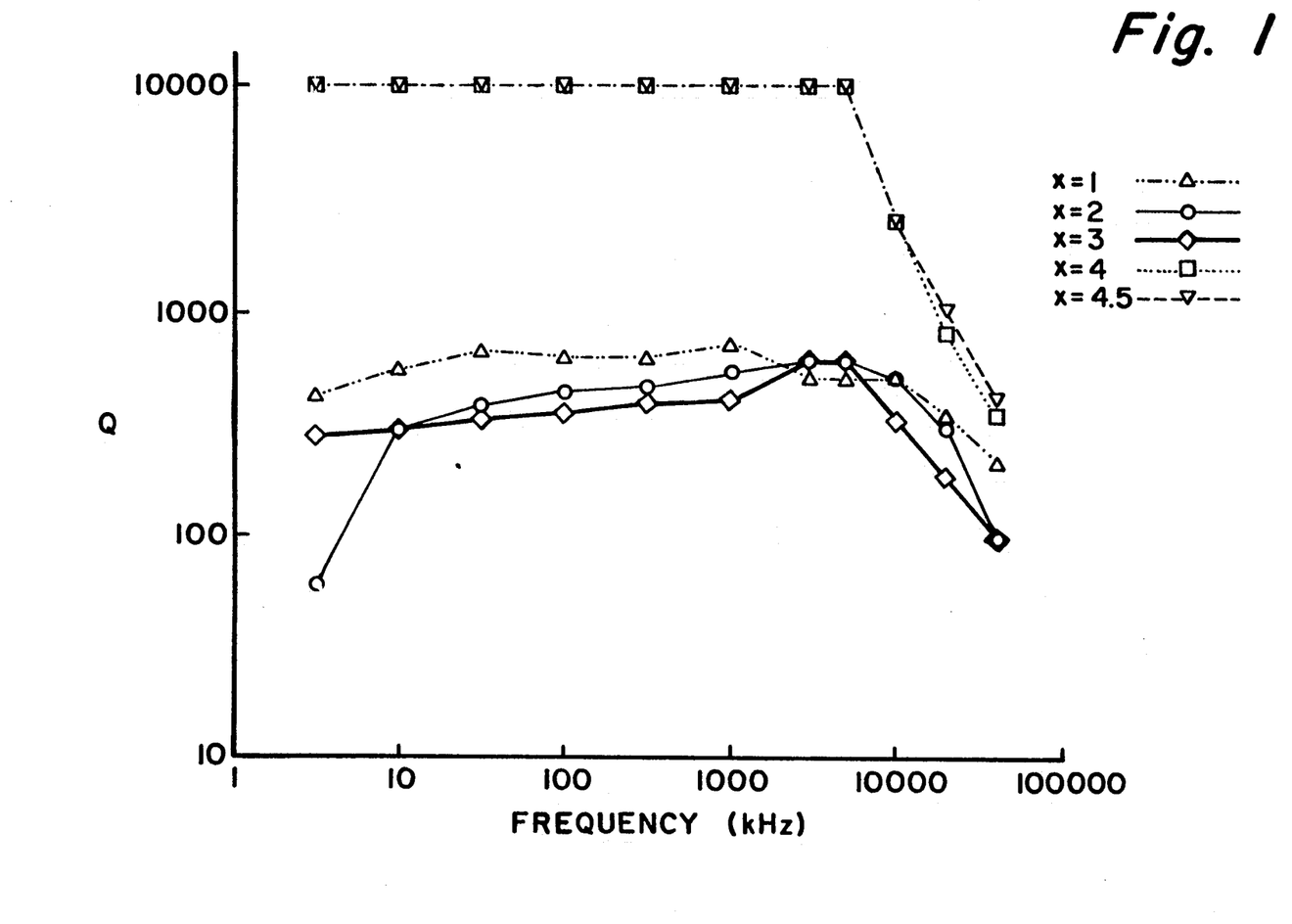
FIG. 1 illustrates the behavior of the room temperature Q factor with respect to frequency for various compositions germane to the present invention.

FIG. 1 demonstrates the the behavior of room temperature Q factor with respect to frequency for the cases where x is equal to 4.5, 4, 3, 2, and 1 in the dielectric compound Bi$_2$O$_3$-x(Mg$_\frac{1}{3}$Nb$_\frac{2}{3}$)O$_2$. Note that when $4 \leq x \leq 5$, the Q factor is greater than or equal to 10$^4$, the sensitivity limit of the equipment, at frequencies between 3.6 kHz and 1 MHz. Systematic increases in frequency beyond 10 MHz result in a monotonic decrease in Q, measuring 400 and 340 for x=4.5 and x=4.0, respectively at 40 MHz.

Figure 2:
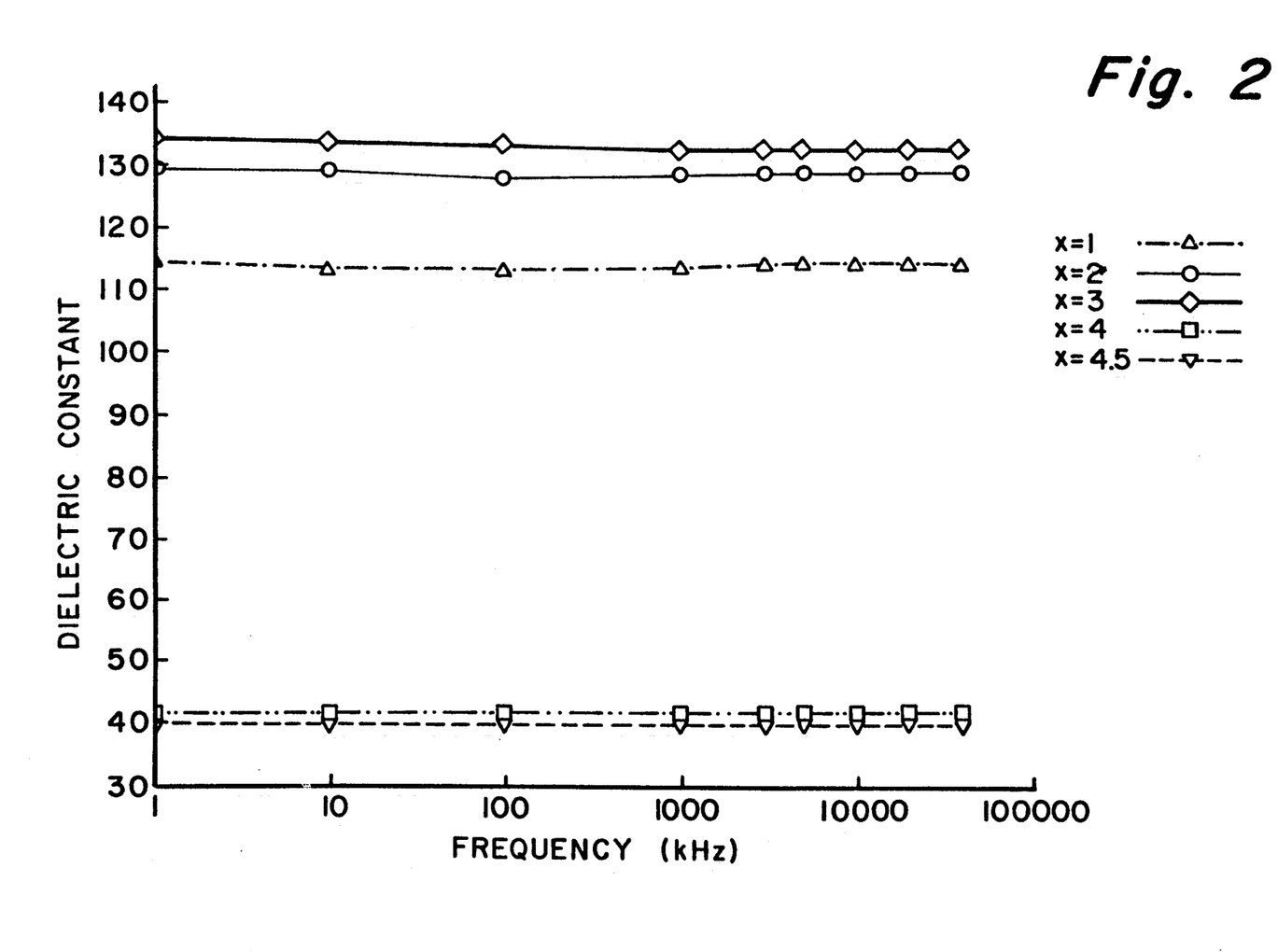
FIG. 2 illustrates the stability of the room temperature dielectric constant with respect to frequency for various compositions germane to the present invention.
Figure 3A:
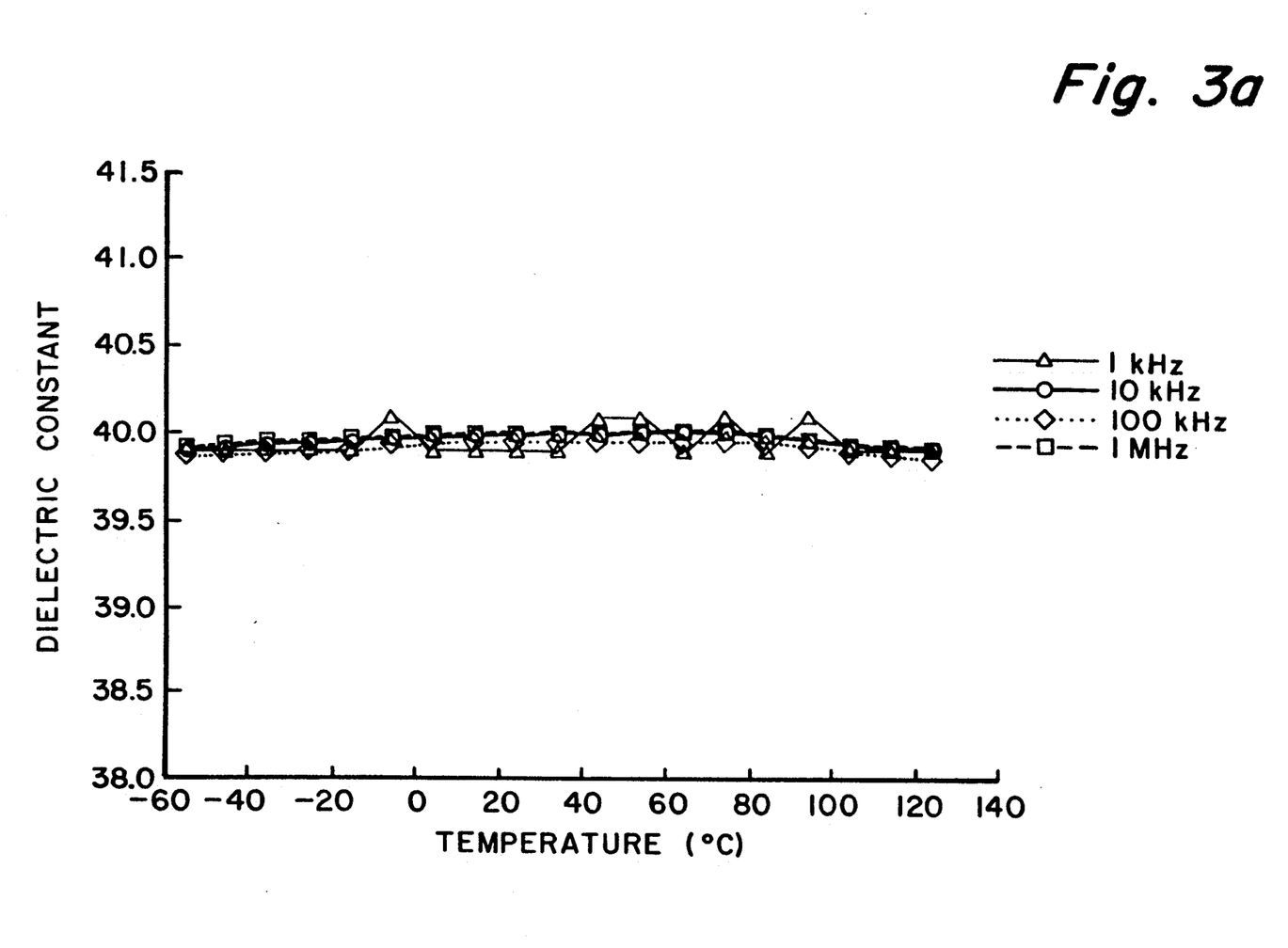
FIGS. 3a–3e illustrate the relationship between the room temperature dielectric constant and the temperature for various individual compositions germane to the present invention.
Figure 3B:
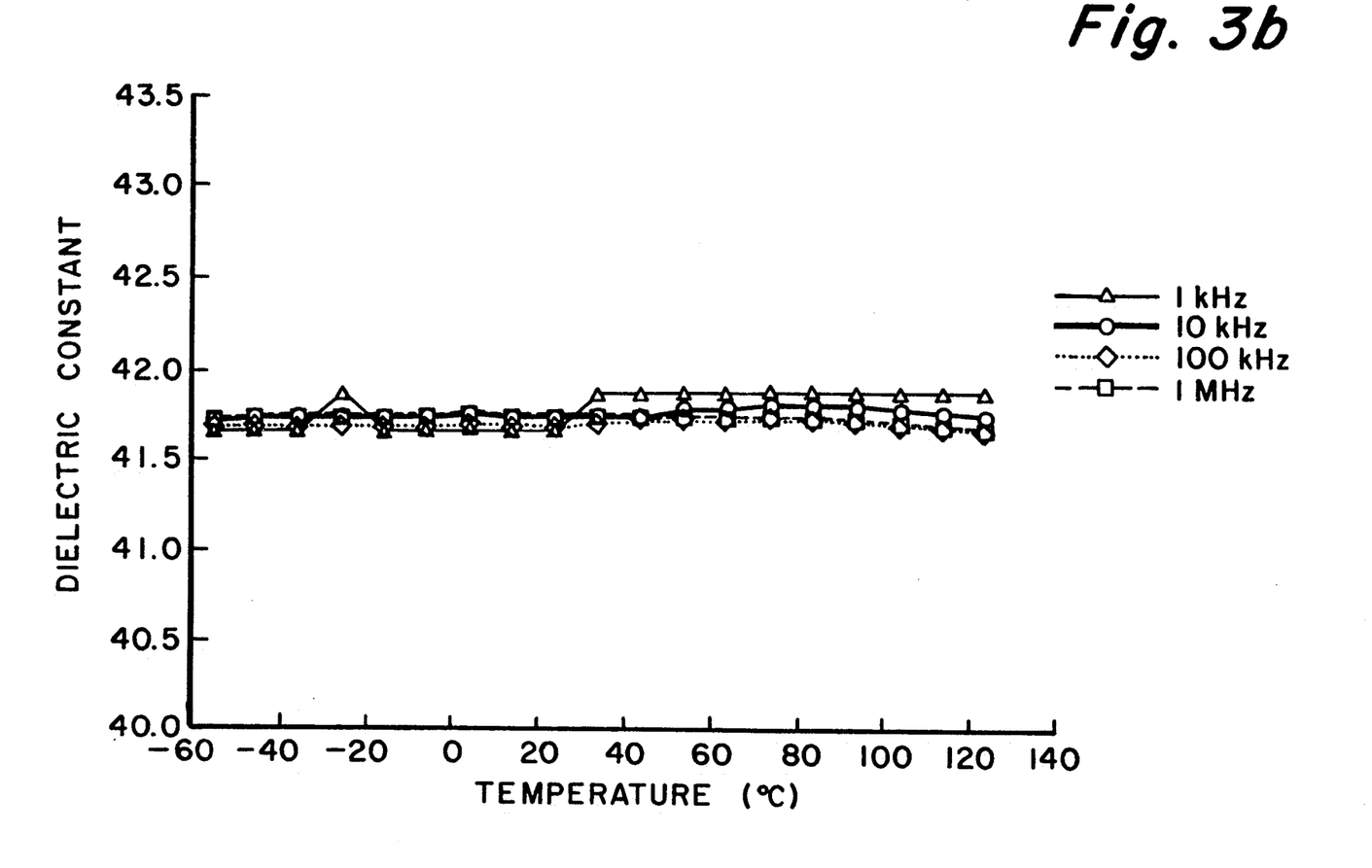
Figure 3C:
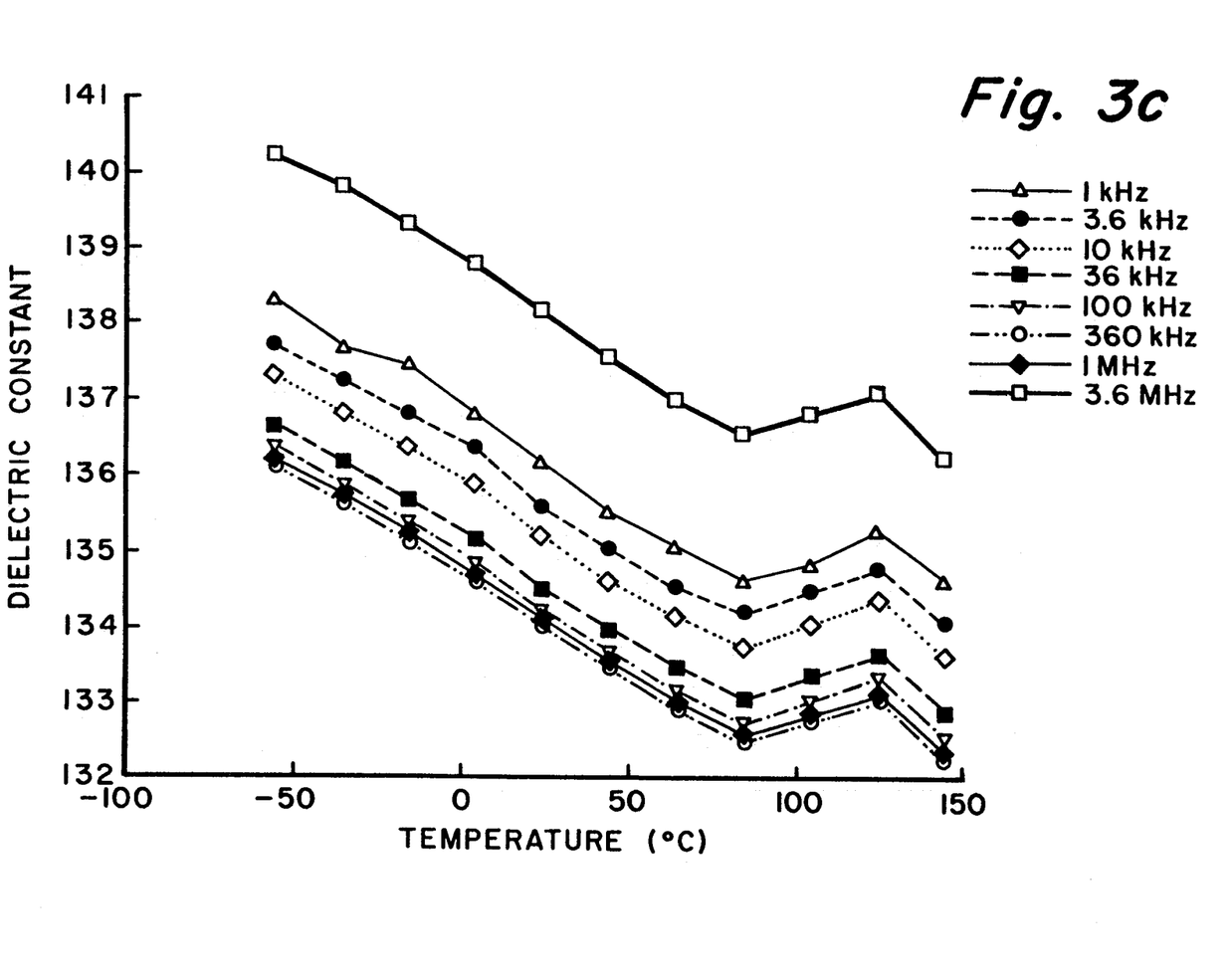
Figure 3D:
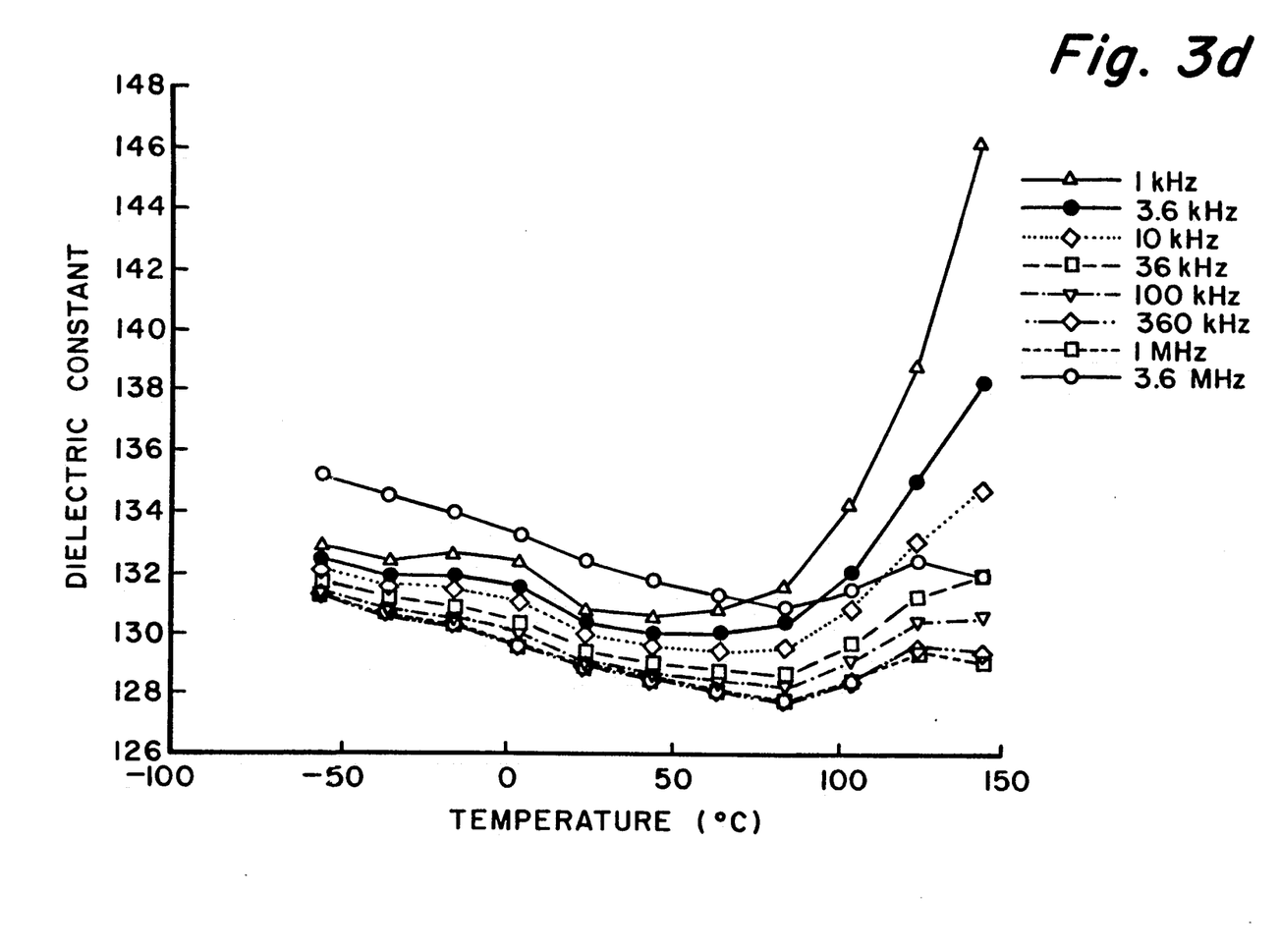
Figure 3E:
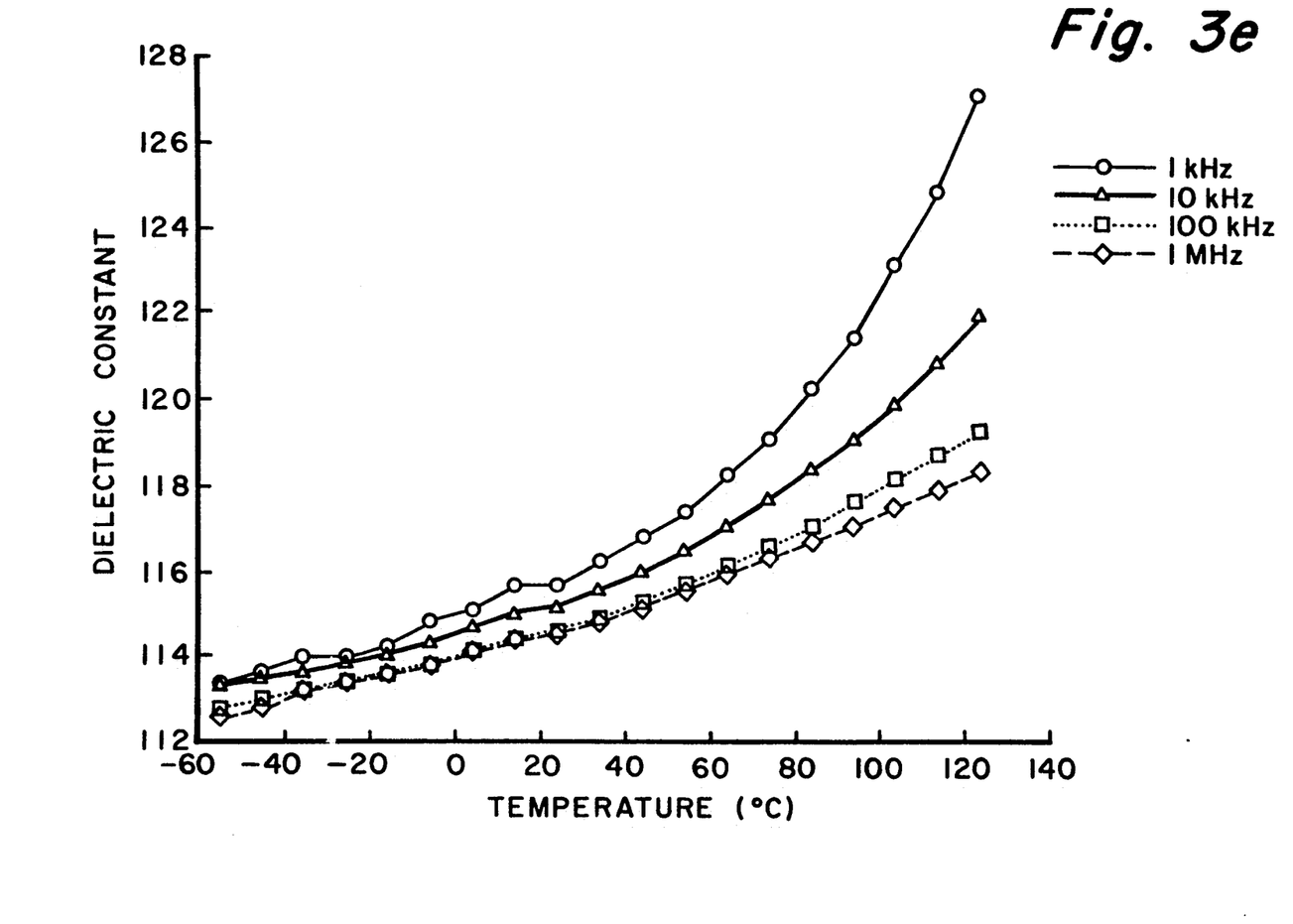

FIG. 2 shows the room temperature dielectric constant, ($\epsilon_r$), as a function of frequency for the same class of materials. Note that the dielectric constants are quite stable over the frequency range of 1 kHz to 40 MHz for all values of x. Note further that exemplary results are demonstrated when x is 4.5 and 4.0; the fluctuation of $\epsilon_r$ is less than 0.26% and 0.41% respectively, over the entire frequency range. When x is less than or equal to 3, good results are demonstrated wherein the fluctuation of $\epsilon_r$ is within 2%.

FIGS. 3a–3e demonstrate the behavior of $\epsilon_r$ with respect to temperature for various frequencies. Note the overall stability of $\epsilon_r$ with respect to temperature changes at the various frequencies. Further note the exemplary results attained in 3a and 3b where $4 \leq x \leq 5$, particularly the decrease and stabilization of $\epsilon_r$.

Example II

The methodology employed in Example I was used in synthesizing the dielectric compounds $Bi_4Mg_3Nb_6O_{24}$ ($x=4.5$) and $Bi_6Mg_4Nb_8O_{33}$ ($x=4$). The room temperature dielectric constant, $\epsilon_r$, as a function of frequency, the TCC and Q values at 1 MHZ of these compounds are given in Table I, where the data for a commercial NPO capacitor ($C=0.01$ $\mu F$) are also included for comparison.

TABLE I

| Sample | Dielectric Const. @ Frequency | | | | TCC (ppm/°C.) | | Q |
|---|---|---|---|---|---|---|---|
| | 1K Hz | 10K Hz | 100K Hz | 1M Hz | −55° C. | 125° C. | |
| $Bi_4Mg_3Nb_6O_{24}$ | 39.9 | 40.0 | 39.9 | 40.0 | 25 | −25 | $10^4$ |
| $Bi_6Mg_4Nb_8O_{33}$ | 41.7 | 41.7 | 41.7 | 41.7 | 6 | −19 | $10^4$ |
| Commercial NPO | 80.2 | 80.2 | 80.2 | 80.6 | −27 | −14 | 435 |

Both the and $Bi_4Mg_3Nb_6O_{24}$ and $Bi_6Mg_4Nb_8O_{33}$ NPO bodies are comparable to, if not better than, the commercial NPO body when tested over a wide frequency range. Note the superior Q factor of these materials as compared to commercial NPO materials, and the stability of the TCC and $\epsilon_r$ when subjected to various frequencies.

We claim:

1. Bismuth-containing, temperature-stable dielectric ceramics that are stable over a wide range of frequency which are defined by the formula $$Bi_2O_3 \; xTiO_2$$

wherein x ranges between 4 and 5 and at least part of the $Ti^{4+}$ ion is replaced with a single pair of mixed ions selected from the group consisting of (1) $A_i^{2+} + B_i^{5+}$,
(2) $R_i^{3+} + C_i^{6+}$,
(3) $A_i^{2+} + C_i^{6+}$,
(4) $R_i^{3+} + B_i^{5+}$,
(5) $M_i^{1+} + B_i^{5+}$, and
(6) $M_{2/5}^{1+} + C_{3/5}^{6+}$, wherein:

$M^+$ is selected from the group consisting of $Li^+$, $Na^+$, $K^+$, $Cu^+$, and $Ag^+$;

$A^{2+}$ is selected from the group consisting of $Mg^{2+}$, $Zn^{2+}$, $Ni^{2+}$, $Co^{2+}$, $Cu^{2+}$, and $Cd^{2+}$;

$R^{3+}$, is selected from the group consisting of $Cr^{3+}$, $Mn^{3+}$, $Fe^{3+}$, $Al^{3+}$, $Ga^{3+}$, $Zn^{3+}$, $Tl^{3+}$, $Sb^{3+}$, $As^{3+}$, $Y^{3+}$, $Lu^{3+}$, $Yb^{3+}$, $Tm^{3+}$, $Er^{3+}$, $Ho^{3+}$, $Dy^{3+}$, $Tb^{3+}$, $Gd^{3+}$, $Eu^{3+}$, and $Sm^{3+}$;

$B^{5+}$ is selected from the group consisting of $Nb^{5+}$, $Ta^{5+}$, and $V^{5+}$; and $C^{6+}$ is selected from the group consisting of $W^{6+}$ and $Mo^{6+}$.

2. Dielectric ceramics according to claim 1 having a composition corresponding to the formula $Bi_6A_4B_8O_{33}$ wherein said $Ti^{4+}$ ions have been totally replaced with a single pair of mixed ions selected from the groups consisting of $A^{2+}$ and $B^{5+}$.

3. Dielectric ceramics according to claim 1 having a composition corresponding to the formula $Bi_6R_8C_4O_{33}$ wherein said $Ti^{4+}$ ions have been totally replaced with a single pair of mixed ions selected from the groups consisting of $R^{3+}$ and $C^{6+}$.

4. Dielectric ceramics according to claim 1 having a composition corresponding to the formula $Bi_2R_2B_2O_{11}$ wherein said $Ti^{4+}$ ions have been totally replaced with a single pair of mixed ions selected from the groups consisting of $R^{3+}$ and $B^{5+}$.

5. Dielectric ceramics according to claim 1 having a composition corresponding to the formula wherein $Bi_2A_2C_2O_{11}$ said $Ti^{4+}$ ions have been totally replaced with a single pair of mixed ions selected from the groups consisting of $A^{2+}$ and $C^{6+}$.

6. Dielectric ceramics according to claim 1 having a composition corresponding to the formula $Bi_2MB_3O_{11}$ wherein said $Ti^{4+}$ ions have been totally replaced with a single pair of mixed ions selected from the groups consisting of $M^+$ and $B^{5+}$.

7. Dielectric ceramics according to claim 1 having a composition corresponding to the formula $Bi_{10}M_8C_{12}O_{55}$ wherein said $Ti^{4+}$ ions have been totally replaced with a single pair of mixed ions selected from the groups consisting of $M^+$ and $C^{6+}$.

8. Dielectric ceramics according to claim 1 having a composition corresponding to the formula $Bi_4A_3B_6O_{24}$ wherein said $Ti^{4+}$ ions have been totally replaced with a single pair of mixed ions selected from the groups consisting of $A^{2+}$ and $B^{5+}$.

9. Dielectric ceramics according to claim 1 having a composition corresponding to the formula $Bi_4R_6C_3O_{24}$ wherein said $Ti^{4+}$ ions have been totally replaced with a single pair of mixed ions selected from the groups consisting of $R^{3+}$ and $C^{6+}$.

10. Dielectric ceramics according to claim 1 having a composition corresponding to the formula $Bi_8A_9C_9O_{48}$ wherein said $Ti^{4+}$ ions have been totally replaced with a single pair of mixed ions selected from the groups consisting of $A^{2+}$ and $C^{6+}$.

11. Dielectric ceramics according to claim 1 having a composition corresponding to the formula $Bi_8R_9B_9O_{48}$ wherein said $Ti^{4+}$ ions have been totally replaced with a single pair of mixed ions selected from the groups consisting of $R^{3+}$ and $B^{5+}$.

12. Dielectric ceramics according to claim 1 having a composition corresponding to the formula $Bi_{16}M_9B_{27}O_{96}$ wherein said $Ti^{4+}$ ions have been totally replaced with a single pair of mixed ions selected from the groups consisting of $M^+$ and $B^{5+}$.

13. Dielectric ceramics according to claim 1 having a composition corresponding to the formula $Bi_{20}M_{18}C_{27}O_{120}$ wherein said $Ti^{4+}$ ions have been totally replaced with a single pair of mixed ions selected from the groups consisting of $M^+$ and $C^{6+}$.

* * * * *

UNITED STATES PATENT AND TRADEMARK OFFICE
CERTIFICATE OF CORRECTION

PATENT NO. : 5,004,713
DATED : April 2, 1991
INVENTOR(S) : Pronob Bardhan and Chyang J. Yu It is certified that error appears in the above-identified patent and that said Letters Patent is hereby corrected as shown below:

Col. 4, line 9, "mo" should read --mole fractions--.

Col. 4, line 48, "$Ba_x Sr_u Ca_z$" should read --$Ba_x Sr_y Ca_z$--.

Col. 4, line 61, "of invention" should read --of $Li_2O$ may be added. Unlike the compositions in the present invention--.

Col. 4, line 66, "D" should read --$Dy_2O_3$--.

Col. 5, line 37, "4>x>5" should read --$4 \leq x \leq 5$--.

Col. 5, line 42, "$Bi_4AB_6O_{24}$" should read --$Bi_4A_3B_6O_{24}$--.

Col. 5, line 56, "5/8" should read --3/8--.

Col. 6, line 41, delete "the", second occurrence.

UNITED STATES PATENT AND TRADEMARK OFFICE
CERTIFICATE OF CORRECTION

PATENT NO. : 5,004,713

DATED : April 2, 1991

INVENTOR(S) : Pronob Bardhan, et al.

It is certified that error appears in the above-identified patent and that said Letters Patent is hereby corrected as shown below:

Column 7, line 19, "the and" should read --the--.

Signed and Sealed this

Fifteenth Day of September, 1992

Attest:

DOUGLAS B. COMER

Attesting Officer

Acting Commissioner of Patents and Trademarks